United States Patent
Zaki (10) Patent No.: US 11,582,587 B1
(45) Date of Patent: Feb. 14, 2023

(54) MESSAGE MANAGEMENT USING SILENT SMS

(71) Applicant: T-Mobile Innovations LLC, Overland Park, KS (US)

(72) Inventor: Ayman Zaki, Renton, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/410,284

(22) Filed: Aug. 24, 2021

(51) Int. Cl.
*H04M 3/22* (2006.01)
*H04L 9/40* (2022.01)
*H04W 4/14* (2009.01)

(52) U.S. Cl.
CPC .................................... *H04W 4/14* (2013.01)

(58) Field of Classification Search
CPC ... H04W 4/14; H04W 12/033; H04W 12/122; H04W 4/02; H04W 12/80; H04W 4/029; H04W 12/04; H04W 12/06; H04W 12/10; H04W 12/128; H04W 4/12; G06Q 10/08; H04M 3/2281; H04L 63/304; H04L 63/06; H04L 63/08; H04L 63/1466; H04L 63/0823
See application file for complete search history.

(56) References Cited

U.S. PATENT DOCUMENTS

| | | | | |
|---|---|---|---|---|
| 9,269,101 B2* | 2/2016 | Kim | .................. | G06Q 30/04 |
| 9,749,821 B1* | 8/2017 | Gupta | .................. | H04W 4/14 |
| 2002/0123360 A1* | 9/2002 | Vikman | .............. | H04Q 3/0029 |
| | | | | 455/466 |
| 2004/0219908 A1* | 11/2004 | Ganor | ................. | H04W 88/184 |
| | | | | 455/435.1 |
| 2004/0248546 A1* | 12/2004 | Bhaumick | ............ | H04W 64/00 |
| | | | | 455/456.1 |
| 2009/0325615 A1* | 12/2009 | McKay | .................. | H04W 4/14 |
| | | | | 455/466 |
| 2012/0174144 A1* | 7/2012 | Flores Xavier | .. | H04N 21/41407 |
| | | | | 725/14 |
| 2014/0206403 A1* | 7/2014 | Buckley | ................. | H04L 69/24 |
| | | | | 455/466 |
| 2017/0302639 A1* | 10/2017 | Chen | ..................... | H04W 12/04 |
| 2019/0020972 A1* | 1/2019 | Glasberg | ............ | H04W 12/033 |

* cited by examiner

*Primary Examiner* — Chris Parry
*Assistant Examiner* — Hassan A Khan
(74) *Attorney, Agent, or Firm* — Jones Robb, PLLC (57) ABSTRACT

A system and method of managing messages in a telecommunications network comprises: transmitting the first SMS message to a wireless device, the first SMS message including a first acknowledgement request and a content processing request; determining whether a first acknowledgement has been received from the wireless device in response to the first acknowledgement request within a first predetermined time period; in response to a determination that the first acknowledgement has not been received within the first predetermined time period: transmitting a second SMS message to the wireless device, the second SMS message including a second acknowledgement request and a content non-processing request; determining whether a second acknowledgement has been received from the wireless device in response to the second acknowledgement request; and in response to a determination that the second acknowledgement has been received within a second predetermined time period, retransmitting the first SMS message to the wireless device.

20 Claims, 7 Drawing Sheets

MESSAGE MANAGEMENT USING SILENT SMS

TECHNICAL BACKGROUND

The Internet Protocol (IP) Multimedia Subsystem (IMS) is a standardized framework for providing IP telephone and multimedia services over a telecommunications network. The services provided over such a network include Short Message Service (SMS) communication, which allow end users to exchange text messages with one another through the network infrastructure. A typical SMS communication begins when one user equipment (UE) initiates a Short Message Mobile Originated (SM MO) to transfer a text message to the network, and ends when the network transfers a corresponding Short Message Mobile Terminated (SM MT) to another UE which has been specified as the recipient.

The operations which occur between the SM MO and the SM MT depend on the radio access technology (RAT) of the network. RATs can include, for example, 3G RATs such as Global System for Mobile Communications (GSM), Code-Division Multiple Access (CDMA), etc.; 4G RATs such as Worldwide Interoperability for Microwave Access (WiMAX), Long Term Evolution (LTE), etc.; and 5G RATs such as new radio (NR). In many RATs, the network transmits a paging request to the MT UE to determine whether the MT UE is established and available. The network then awaits a response before transferring the SM MT to the MT UE. In IMS, however, it is always assumed that the MT UE is established and available. Therefore, the network immediately attempts to transfer the SM MT to the MT UE. In either case, the network awaits an acknowledgement from the MT UE in order to determine that the text message has been successfully received.

OVERVIEW

Various aspects of the present disclosure relate to systems and methods of managing messages in a network, such as SMS messages in a telecommunications network.

In one exemplary aspect of the present disclosure, a method of managing messages in a network comprises: adding a first short messaging service (SMS) message to a transmission queue; transmitting the first SMS message to a wireless device, the first SMS message including a first acknowledgement request and a content processing request; determining whether a first acknowledgement has been received from the wireless device in response to the first acknowledgement request within a first predetermined time period; in response to a determination that the first acknowledgement has not been received within the first predetermined time period: adding a second SMS message to the transmission queue at a queue position earlier than the first SMS message, the second SMS message including a second acknowledgement request and a content non-processing request, and transmitting the second SMS message to the wireless device; determining whether a second acknowledgement has been received from the wireless device in response to the second acknowledgement request within a second predetermined time period; and in response to a determination that the second acknowledgement has been received within the second predetermined time period, removing the second SMS message from the transmission queue and retransmitting the first SMS message to the wireless device.

In another exemplary aspect of the present disclosure, a system for managing messages in a network comprises: a processing node; and an electronic processor coupled to the processing node, the electronic processor being configured to perform operations comprising: transmitting a first short messaging service (SMS) message to a wireless device, the first SMS message including a first acknowledgement request and a content processing request, determining whether a first acknowledgement has been received from the wireless device in response to the first acknowledgement request within a first predetermined time period, in response to a determination that the first acknowledgement has not been received within the first predetermined time period, transmitting a second SMS message to the wireless device, the second SMS message including a second acknowledgement request and a content non-processing request, determining whether a second acknowledgement has been received from the wireless device in response to the second acknowledgement request within a second predetermined time period, and in response to a determination that the second acknowledgement has been received within the second predetermined time period, retransmitting the first SMS message to the wireless device.

In another exemplary aspect of the present disclosure, a processing node in a telecommunications network is configured to perform operations comprising: adding a first short messaging service (SMS) message to a transmission queue; transmitting the first SMS message to a wireless device, the first SMS message including a first acknowledgement request and a content processing request; determining whether a first acknowledgement has been received from the wireless device in response to the first acknowledgement request within a first predetermined time period; in response to a determination that the first acknowledgement has not been received within the first predetermined time period: adding a second SMS message to the transmission queue at a queue position earlier than the first SMS message, the second SMS message including a second acknowledgement request and a content non-processing request, and transmitting the second SMS message to the wireless device; determining whether a second acknowledgement has been received from the wireless device in response to the second acknowledgement request within a second predetermined time period; and in response to a determination that the second acknowledgement has been received within the second predetermined time period, removing the second SMS message from the transmission queue and retransmitting the first SMS message to the wireless device.

In this manner, these and other aspects of the present disclosure provide for improvements in at least the technical field of telecommunications, as well as the related technical fields of network message management, device management, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as flowcharts, schematics, and system configurations. It will be readily apparent to one skilled in the art that these specific details are merely exemplary and not intended to limit the scope of this application.

An SMS transfer operation includes the message transfer and an acknowledgement from the recipient wireless device. When sending a message to a wireless device that is connected to a network using a RAT other than IMS, the network issues a paging request to the recipient device and awaits a response before sending the message data itself. When sending a message to a wireless device that is connected to a network using IMS, however, the network does not send a paging request prior to message transfer because it is assumed that the recipient device is established and available. In either case, the acknowledgement informs the network that the SMS has been received and processed. Therefore, if the network does not receive an acknowledgement of the SMS, it may assume that the recipient device did not receive the SMS and attempt retransmission. This is the case even if the SMS was received and process, but the acknowledgement did not properly reach the network. If so, the network's assumption is erroneous and will result in a duplicate message. This may occur several times until a device power cycles or a network registration refresh is performed, and therefore result in a large number of duplicate messages received by the recipient device without the network ever realizing that each message was properly received and processed. The present disclosure provides for systems and methods of avoiding the occurrence of duplicate messages.

In accordance with various aspects of the present disclosure, an IMS network may be provided by an access node. The access node may utilize one or more antennas or other communication circuitry to communicate with wireless devices or UEs. These UEs may be configured for communication using RATs in addition to IMS, such as 5G New Radio (NR). The access nodes themselves may additionally be configured for communication in multiple RATs in addition to IMS, and may be configured to allow communication between different UEs operating on different RATs. In one particular example, the access nodes may be configured to allow a first user connected via 5G NR to send a message (e.g., an SMS message) to a second user connected via IMS.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as a smartphone, a tablet, a laptop computer, and so on.

In addition to the particular systems and methods described herein, the operations described herein may be implemented as computer-readable instructions or methods, and a processing node or nodes on the network for executing the instructions or methods. The processing node or nodes may include a processor included in the access node and/or a processor included in any controller node in the wireless network that is coupled to the access node.

Figure 1:
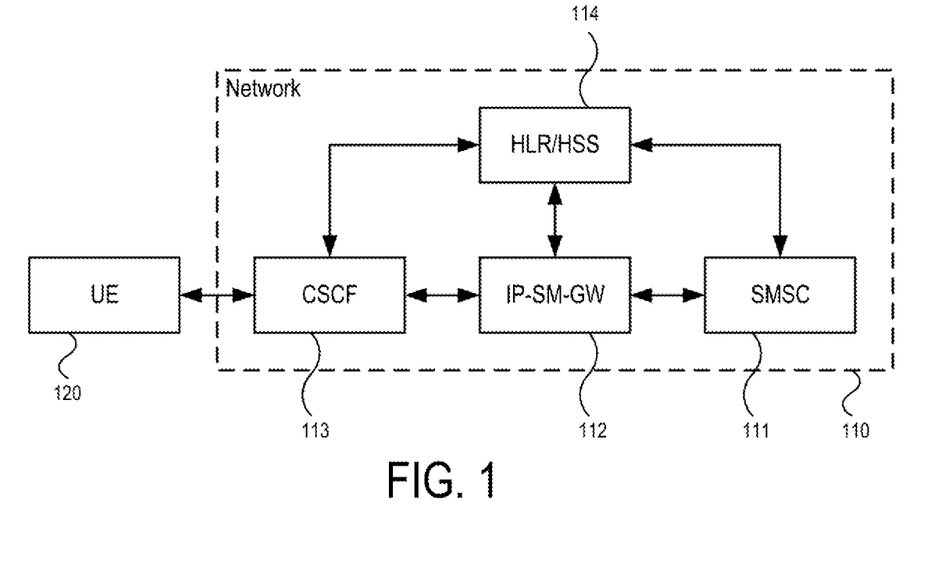
FIG. 1 illustrates an exemplary network architecture in accordance with various aspects of the present disclosure.

FIG. 1 illustrates an exemplary network architecture diagram for implementing IMS in accordance with various aspects of the present disclosure. As shown in FIG. 1, bidirectional communication occurs between components of a network 110 and a UE 120. The communication may include telephony, data services, and messaging services such as SMS and/or Multimedia Messaging Service (MMS). For purposes of illustration, only a subset of components of the network 110 are shown, and in practice many additional components may be present. In FIG. 1, the network 110 includes a Short Message Service Center (SMSC) 111, an Internet Protocol Short Message Gateway (IP-SM-GW) 112, a Call Session Control Function (CSCF) 113, and a Home Subscriber Server (HSS)/Home Location Register (HLR) 114.

The SMSC 111 handles SMS routing and delivery functions in the network 110. These functions include the reception of SM MOs, the forwarding of messages (e.g., to the location indicated by routing information received from the HSR/HLR 114), the storage and scheduling of messages (e.g., via a transmission queue as will be described in more detail below), the maintenance of unique service center (SC) timestamps, and the delivery of SM MTs.

The IP-SM-GW 112 provides the protocol interworking for delivery of SMS messages between the UE 120 and the SMSC 111. The IP-SM-GW 112 functions to determine the domain for delivery of an SMS message, to respond to routing information requests made by the SMSC 111 and forwarded from the HSS/HLR 114, to determine the validity of the MO UE and MS UE addresses, to act as an application server to the network core, to connect to other network components using particular protocols, and so on.

The CSCF 113 provides the central control functionality in the IMS network to initiate, modify, and terminate sessions. While not particularly illustrated in FIG. 1, the CSCF 113 may include a Proxy CSCF (P-CSCF), an Interrogating CSCF (I-CSCF), and a Serving CSCF (S-CSCF). The CSCF 113 operates to provide communication with the UE 120. The UE 120 may request services from the network 110 by sending a request to the P-CSCF of the CSCF 113, which will forward the request to the appropriate network component. For example, the UE 120 may register and de-register from the network 110 by sending an appropriate request via the S-CSCF of the CSCF 113.

The HSS/HLR 114 stores subscriber information, including location information, device identity information, authentication information, and so on. The HSS/HLR 114 may, for example, receive address requests from the I-CSCF of the CSCF 113 and/or the IP-SM-GW 112 and provide the requested information to the requesting component so that the network 110 may forward a message to the appropriate destination. The HSS/HLR 114 may additionally support registration and deregistration of the UE 120 with the IP-SM-GW 112

As noted above, in many RATs (e.g. 3G, 4G, and 5G RATs) the network issues a paging request to the MT UE and awaits a response before transferring the SM MT to the MT UE. However, in IMS the network 110 always assumes that the MT UE is established and available. Therefore, the network 110 immediately attempts to transfer the SM MT to the MT UE without the use of a paging request or response. If the network 110 does not receive an acknowledgement of the SM MT, then the network 110 may assume that the MT UE did not receive the SM MT. In some scenarios (e.g., if the MT UE is malfunctioning and/or is in an area of poor upload connectivity), the MT UE may in fact have received and processed (e.g., displayed to the user) the SM MT. In such scenarios, the MT UE transmits the acknowledgment but the acknowledgement may not be received by the network 110. The network 110 may then erroneously assume that the SM MT was not successfully transferred to the MT UE and attempt retransmission. This may occur several times until a device power cycles or a network registration refresh is performed, such that the MT UE receives the same message and repeatedly displays the same message to the user, but the many acknowledgments never reach the network 110.

Figure 2A:
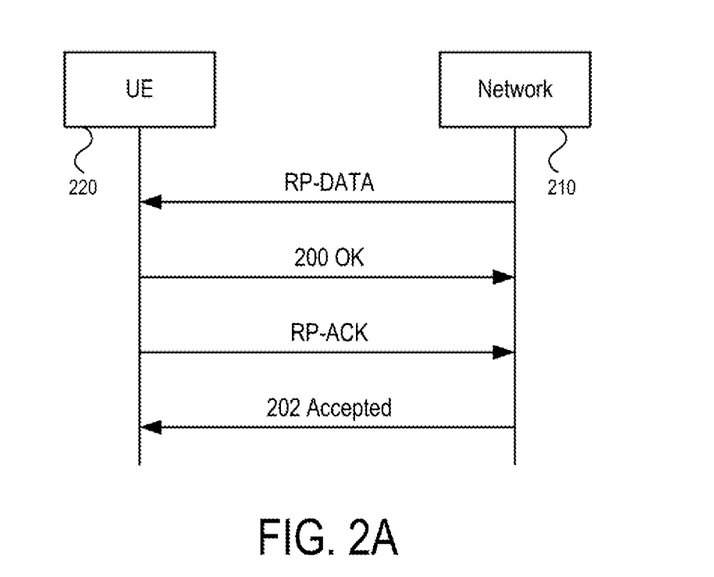
FIGS. 2A-2C respectively illustrate exemplary communication flows for a message.
Figure 2B:
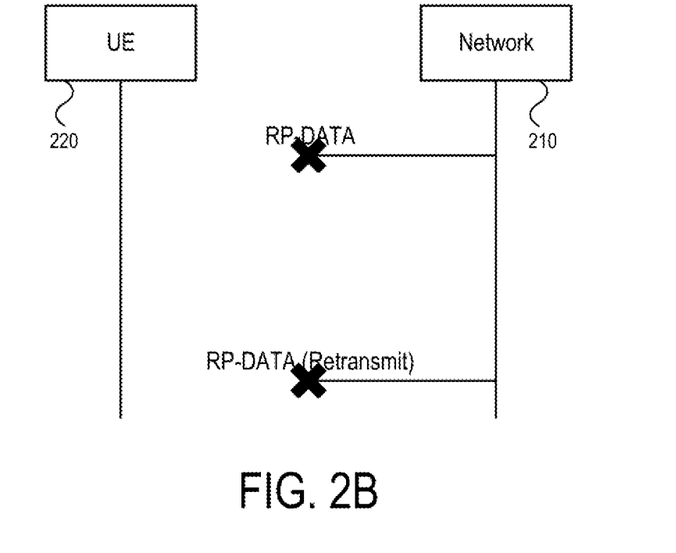
Figure 2C:
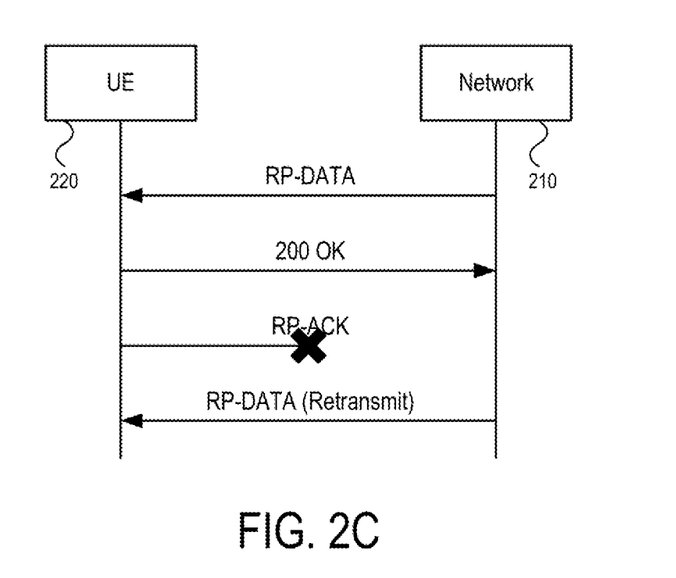

FIGS. 2A-2C respectively illustrate exemplary communication flows between a network 210 and an MT UE 220. The network 210 may be the same as or similar to the network 110 illustrated in FIG. 1, and the MT UE 220 may be the same as or similar to the UE 120 illustrated in FIG. 1. FIG. 2A illustrates an exemplary communication flow over IMS between the network 210 and the MT UE 220 when an IP SMS is successfully received and acknowledged. The network 210 (which will be described in more detail below), assuming that the MT UE 220 is available and reachable, transmits an SMS message (RP-DATA) to the MT UE 220. The MT UE 220 responds (200 OK), processes the message, and acknowledges (RP-ACK) the SMS message to the network 210. Processing the message may include displaying the content of the SMS message to the user and storing the SMS message in a memory, such as a subscriber identification module (SIM) card or an internal memory of the MT UE 220. The network 210 then indicates that the acknowledgement has been accepted (202 Accepted) and the communication flow ends.

FIGS. 2B and 2C illustrate scenarios where errors occur in the communication flow in a comparative management system. FIG. 2B shows an exemplary communication flow over IMS between a network 210 and an MT UE 220 when an IP SMS is not successfully received. The network 210, assuming that the MT UE 220 is available and reachable, transmits an SMS message (RP-DATA) to the MT UE 220. However, the SMS message never reaches the MT UE 220. The network 210 may wait for an acknowledgement for a predetermined period of time, which may be set by the network operator. If the network 210 does not receive the acknowledgement within the predetermined period of time, the network 210 retransmits the SMS message. FIG. 2C shows an exemplary communication flow over IMS between a network 210 and an MT UE 220 when an IP SMS is successfully received but not successfully acknowledged. The network 210, assuming that the MT UE 220 is available and reachable, transmits an SMS message (RP-DATA) to the MT UE 220. The MT UE 220 attempts to acknowledge (RP-ACK) the SMS message to the network 210, but the acknowledgement does not reach the network 210. The network 210 may wait for an acknowledgement for a predetermined period of time, which may be set by the network operator. If the network 210 does not receive the acknowledgement within the predetermined period of time, the network 210 retransmits the SMS message. This results in a duplicate SMS message at the MT UE 220, and may occur repeatedly until an acknowledgement finally reaches the network 210.

The scenario illustrated in FIG. 2B may occur if the MT UE 220, is out of communication range, has disconnected without properly de-registering from the network 210, and so on. The scenario illustrated in FIG. 2C may occur if the MT UE 220 is malfunctioning, if the MT UE 220 is at a network edge such that it has poor upload connectivity, due to internal errors within the network 210, and so on. From the perspective of the network 210, there is no apparent difference between the scenario illustrated in FIG. 2B and the scenario illustrated in FIG. 2C. Therefore, the comparative management system responds to both scenarios in a similar manner: by attempting to resend the SMS (e.g., by placing or maintaining the SMS at the head of a transmission queue) until an acknowledgement is received. From the perspective of the MT UE 220, however, the scenario illustrated in FIG. 2C results in the repeated display of the content of the SMS message, as well as the repeated occurrence of related events such as ringtones, vibrations, notification windows, and so on.

Figure 3:
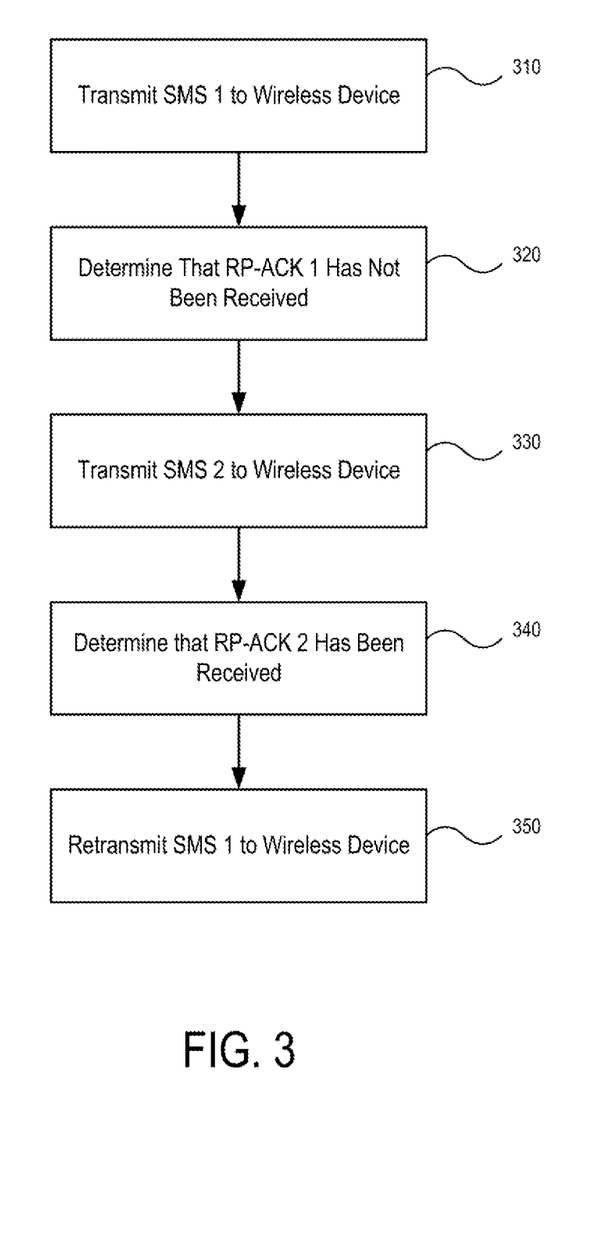
FIGS. 3 and 4 respectively illustrate exemplary process flows in accordance with various aspects of the present disclosure.

FIG. 3 illustrates an exemplary message management method according to various aspects of the present disclosure, which prevents the MT UE from receiving repeated redundant SMS messages. The operations illustrated in FIG. 3 may be performed by an entity of the network 110 or the network 210; for example, by or under the control of the SMSC 111. The method beings at operation 310 with the network entity transmitting a first SMS message to a wireless device (i.e., the MT UE). The first SMS message includes an acknowledgement request and a content processing request (e.g., instructions to display the payload data). The network entity then awaits a delivery report from the wireless device, such as the acknowledgement RP-ACK responsive to the acknowledgement request in the first SMS message. As above, the duration of the predetermined period of time may be set by a network operator. If the predetermined period of time elapses without receipt of the delivery report, at operation 320 the network entity may determine that no acknowledgement has been received. These operations may be the same as or similar to those described above with regard to FIGS. 2B and 2C.

However, whereas the comparative management system of FIGS. 2B and 2C responded to a lack of acknowledgement by repeatedly retransmitting the original SMS message, the message management system and method in accordance with the present disclosure instead attempts to transmit a second SMS message to the wireless device. The second SMS message is referred to herein as a "silent SMS" message, and includes an acknowledgement request but a content non-processing request. The silent SMS message may be a Short Message Type 0, which indicates that the UE must acknowledge receipt of the short message but shall discard its contents (i.e., not display or process the message). As such, the UE is able to receive the silent SMS even if there is no memory available in the UE, does not indicate the receipt of the silent SMS to the user, and does not store the silent SMS in memory.

The network entity then awaits a delivery report from the wireless device, such as an acknowledgement RP-ACK responsive to the acknowledgement request in the second SMS message. Once the network entity has determined that the acknowledgement has been received in response to the second SMS message, the network entity retransmits the first SMS message to the wireless device.

Figure 4:
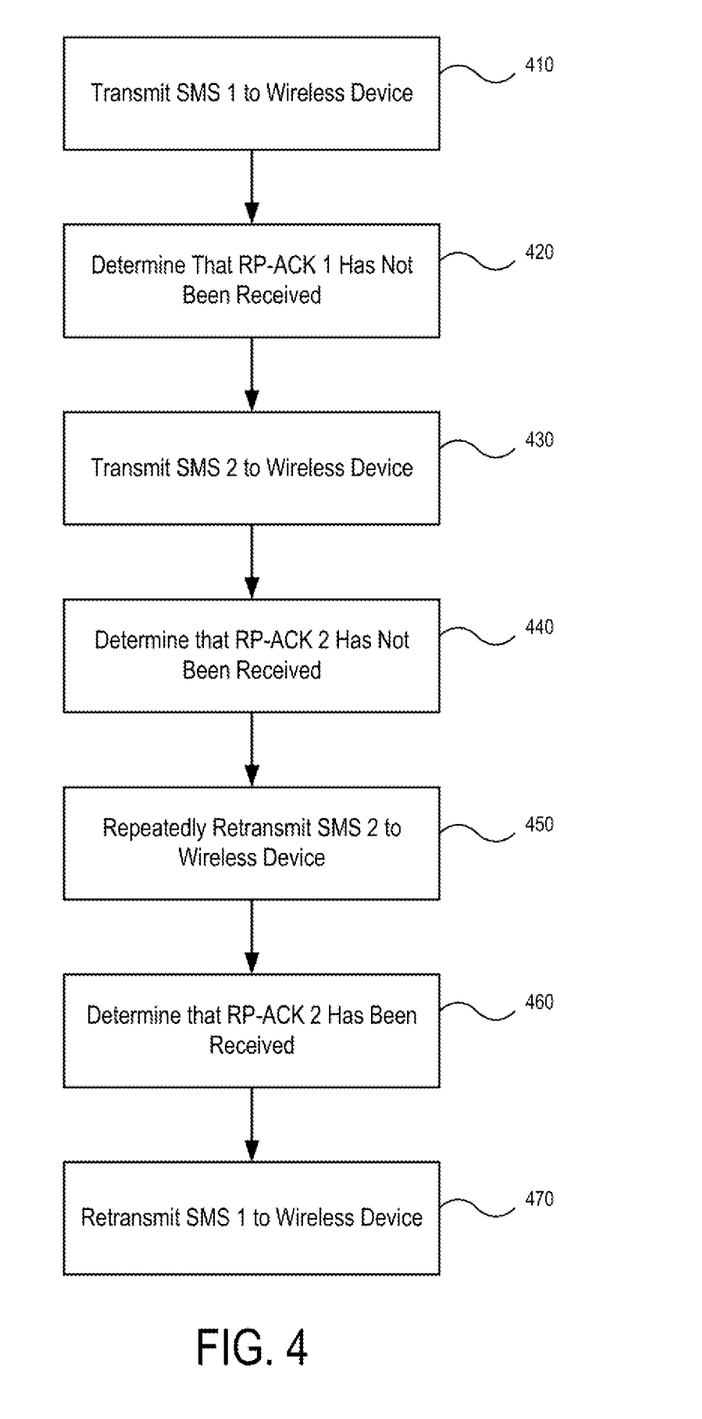

FIG. 4 illustrates an exemplary message management method in accordance with the present disclosure, which may be implemented to account for scenarios in which no acknowledgement is initially received in response to the silent SMS. The operations illustrated in FIG. 4 may be performed by an entity of the network 110 or the network 210; for example, by or under the control of the SMSC 111. The method beings at operation 410 with the network entity transmitting a first SMS message to a wireless device (i.e., the MT UE). The first SMS message includes an acknowledgement request and a content processing request (e.g., instructions to display the payload data). The network entity then awaits a delivery report from the wireless device, such as the acknowledgement RP-ACK responsive to the acknowledgement request in the first SMS message. As above, the duration of the predetermined period of time may be set by a network operator. If the predetermined period of time elapses without receipt of the delivery report, at operation 420 the network entity may determine that no acknowledgement has been received.

In this case, the message management system and method in accordance with the present disclosure attempts to transmit a second SMS message to the wireless device. The second SMS message is a silent SMS message, and includes an acknowledgement request but a content non-processing request. The silent SMS message may be a Short Message Type 0. The operations 410-430 may be the same as or similar to the operations 310-330 illustrated in FIG. 3. After transmitting the second SMS message, the network entity awaits a delivery report from the wireless device, such as the acknowledgement RP-ACK responsive to the acknowledgement request in the second SMS message. As above, the duration of the predetermined period of time may be set by a network operator. The predetermined period of time for receiving an acknowledgement of the second SMS message may be the same as or different from the predetermined period of time for receiving an acknowledgement of the first SMS message. If the predetermined period of time elapses without receipt of the delivery report, at operation 440 the network entity may determine that no acknowledgement has been received.

In response, the network entity at operation 450 repeatedly retransmits the second SMS to the wireless device at a predetermined interval, which may be set in advance by the network operator and which may be the same as or different from the predetermined period of time for receiving an acknowledgement of the second SMS message after the initial transmission. After each repetition, the network entity awaits the acknowledgement of the second SMS message. Once a determination has been made at operation 460 that the acknowledgement of the second SMS message has been received, the network entity ceases the repeated retransmission of the second SMS message and at operation 470 retransmits the first SMS message to the wireless device.

Figure 5A:
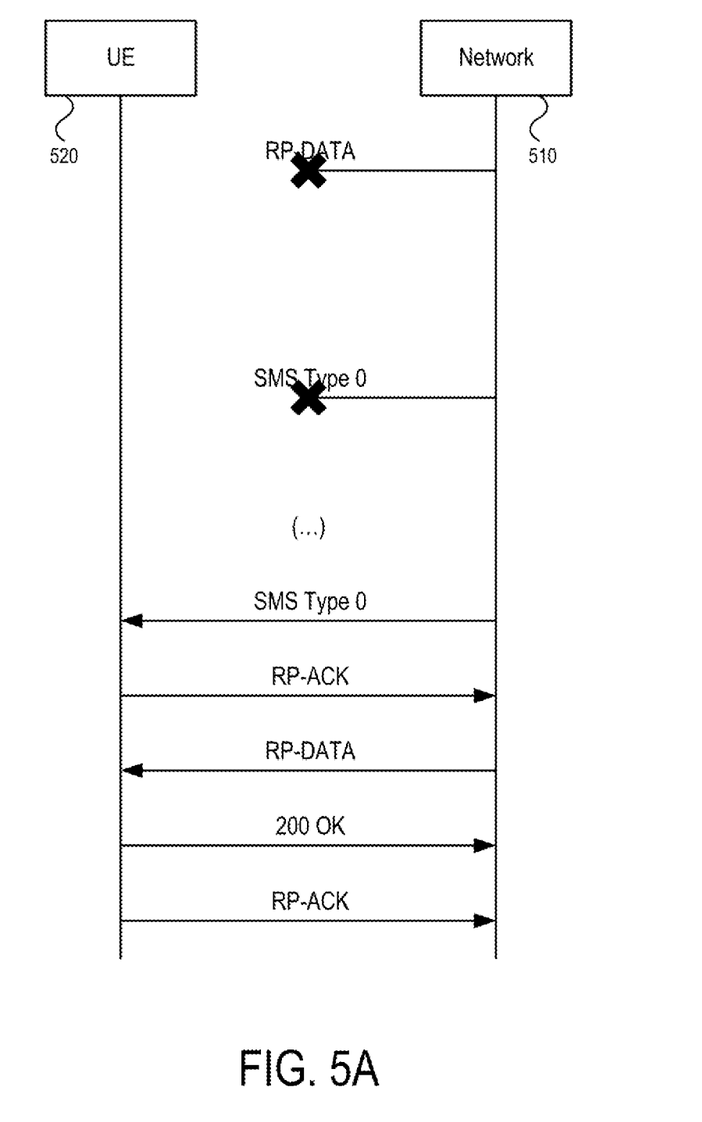
FIGS. 5A and 5B illustrate exemplary communication flows in accordance with various aspects of the present disclosure.
Figure 5B:
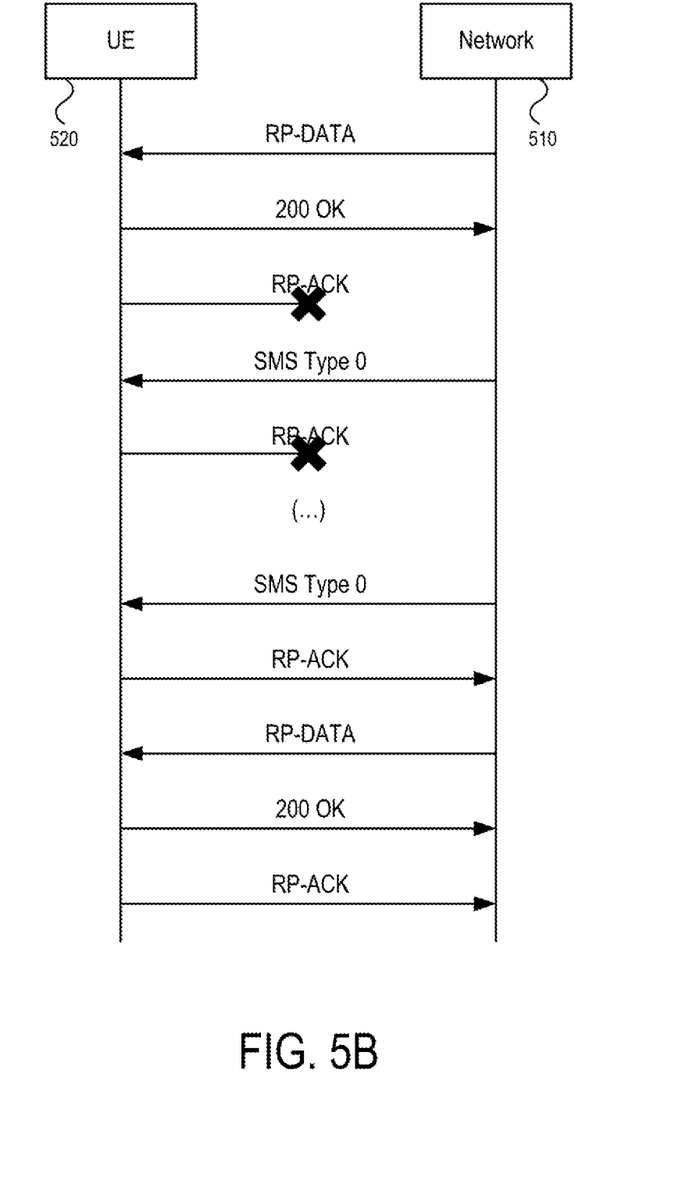

The effects of the message management method of FIG. 4 are illustrated in FIGS. 5A and 5B, and may be compared to the communication flows illustrated in FIGS. 2B and 2C, respectively. In FIGS. 5A and 5B, communication is attempted between a network 510 (which may be the same as or similar to the network 110 described above) and an MT UE 520. In FIG. 5A, as in FIG. 2B, the lack of an acknowledgement is due to downlink transmission errors in the communication between the network 510 and the MT UE 520. In FIG. 5A, the initial transmission of a first SMS message (e.g., as in operation 410) is unsuccessful. After the predetermined period of time has elapsed, the initial transmission of a second SMS message (e.g., as in operation 430) is also unsuccessful. The network 510 repeatedly retransmits the second SMS message (e.g., as in operation 450) until one of the retransmissions is successful and an acknowledgement is received (e.g., as in operation 460). Then, the network 510 retransmits the first SMS message (e.g., as in operation 470), which is successfully received and acknowledged by the MT UE 520.

In FIG. 5B, as in FIG. 2C, the lack of an acknowledgement may be due to a malfunctioning MT UE 520 and/or due to uplink transmission errors in the communication between the network 510 and the MT UE 520. In FIG. 5B, the initial transmission of a first SMS message (e.g., as in operation 410) is successful but the MT UE 520 fails to acknowledge or the acknowledgement does not reach the network 510. After the predetermined period of time has elapsed, the initial transmission of a second SMS message (e.g., as in operation 430) is also successful but the acknowledgement is also unsuccessful. The network 510 repeatedly retransmits the second SMS message (e.g., as in operation 450) until an acknowledgement of one of the retransmissions is received (e.g., as in operation 460). Then, the network 510 retransmits the first SMS message (e.g., as in operation 470), which is successfully received and acknowledged by the MT UE 520.

In scenarios where the lack of an acknowledgement is due to uplink transmission errors (e.g., as described with regard to FIG. 5B above), the message management method of FIG. 4 will still result in the repeated receipt of an SMS message. However, because the repeatedly-received SMS message is a silent SMS message, the user does not receive repeated ringtones, vibrations, notification windows, and so on. As such, the use of a silent SMS for the repeated retransmission results in a smaller processing and/or memory footprint in the wireless device, and/or avoids significant degradation in the user experience.

While FIGS. 3-5B illustrate exemplary process flows in which the first retransmission of the first SMS message is successfully received, the present disclosure is not so limited. In some implementations, if the retransmission of the first SMS message is not acknowledged after the second SMS message has been acknowledged, the message management system and method may repeat the silent SMS operations (e.g., operations 330-340 or operations 430-460) with a new second SMS message.

Figure 6A:
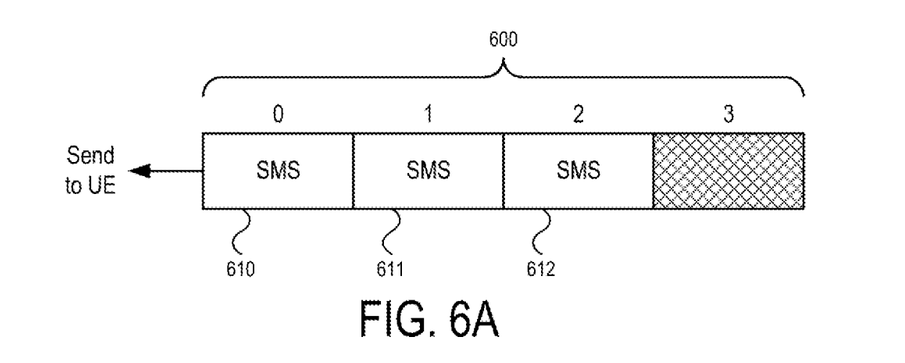
FIGS. 6A and 6B illustrate an exemplary transmission queue in accordance with various aspects of the present disclosure.
Figure 6B:
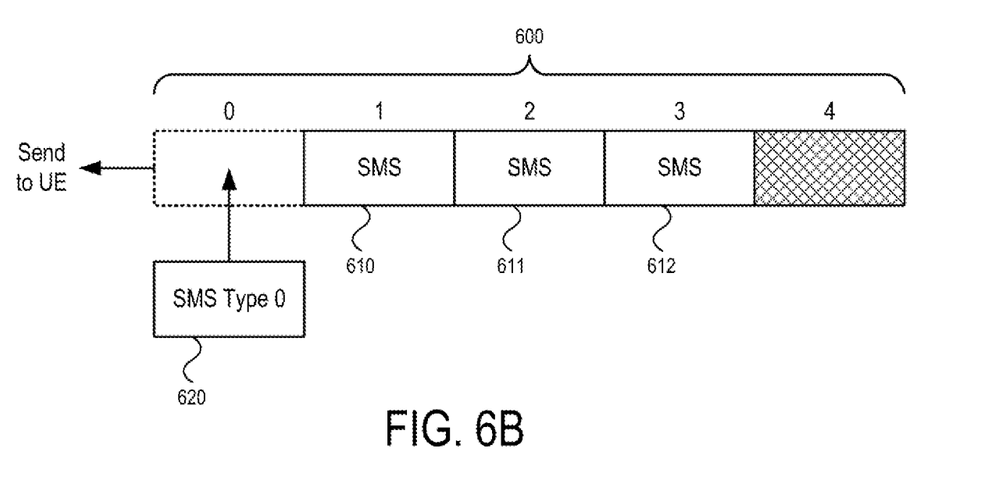

In order to facilitate the scheduling of SMS messages within a message management system in accordance with the present disclosure, the network may implement a transmission queue. In particular implementations, the transmission queue may be implemented by an SMSC, such as the SMSC 111 of the network 110 illustrated in FIG. 1. FIGS. 6A and 6B illustrate one example of a transmission queue 600.

As shown in FIG. 6A, the transmission queue 600 includes a plurality of queue positions indexed beginning with 0, which represents the earliest queue position (i.e., the position which is sent first). In queue positions 0, 1, and 2, the transmission queue respectively includes an SMS message 610, 611, and 612 which are scheduled to be sent to the UE. Queue position 3 is empty in this example. While FIG. 6A illustrates four available queue positions, in practice any number of queue positions may be available as determined by, for example, the network operator, the available memory, and so on.

Upon receiving an SM MO from an MO UE, the SMSC may add the message to the appropriate queue position.

When transferring an SM MT to an MT UE, the SMSC selects the SMS message 610 located in queue position 0 and transmits it to the MT UE. This may correspond to the operation 310 illustrated in FIG. 3 and/or the operation 410 illustrated in FIG. 4. Depending on the network configuration, the SMSC either may remove the SMS message 610 from the transmission queue 600 upon transmission or may retain the SMS message 610 in the transmission queue 600 until an acknowledgement of the SMS message 610 is received.

In the event that the acknowledgement of the SMS message 610 is not received within a predetermined time period, the SMSC may modify the transmission queue 600 as shown in FIG. 6B. In FIG. 6B, the SMSC inserts a silent SMS (i.e., an SMS Type 0) 620 to the transmission queue 600 at queue position 0 and de-prioritizes the SMS messages 610-612 by one queue position. In implementations where the SMSC removes the SMS message 610 upon transmission, the SMSC may instead insert the silent SMS 620 to the transmission queue 600 at queue position 0, re-insert the SMS message 610 to the transmission queue 600 at queue position 1, and de-prioritize the SMS messages 611 and 612 by the appropriate amount.

Then, the SMSC may select the silent SMS 620 located in queue position 0 and transmit it to the MT UE. This may correspond to the operation 330 illustrated in FIG. 3 and/or the operation 430 illustrated in FIG. 4. Depending on the network configuration, the SMSC either may remove the silent SMS 620 from the transmission queue 600 upon transmission or may retain the silent SMS 620 in the transmission queue 600 until an acknowledgement of the silent SMS 620 is received.

In the event that the acknowledgement of the silent SMS 620 is not received within a predetermined time period, the SMSC may maintain the silent SMS 620 in queue position 0. In implementations where the SMSC removes the silent SMS 620 from the transmission queue 600 upon transmission, the SMSC may instead re-insert the silent SMS 620 to the transmission queue 600 at queue position 0 and de-prioritize the SMS messages 610-612 by the appropriate amount. The SMSC may then retransmit the silent SMS 620 to the MT UE, repeatedly if necessary, until an acknowledgement of the silent SMS 620 is received. This may correspond to the operation 450 illustrated in FIG. 4.

When the acknowledgement of the silent SMS 620 is received (either in response to the first transmission or the silent SMS 620 or any subsequent retransmission), the SMSC may remove the silent SMS 620 from the transmission queue 600 if it remains. Then, the SMSC may retransmit the SMS message 610 from queue position 0 to the MT UE. This may correspond to the operation 350 illustrated in FIG. 3 and/or the operation 470 illustrated in FIG. 4. Finally, when the acknowledgement of the SMS message 610 is received, the SMSC may remove the SMS message 610 from the queue if it remains.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing messages in a network, comprising:
adding a first short messaging service (SMS) message to a transmission queue;
transmitting the first SMS message to a wireless device, the first SMS message including a first acknowledgement request and a content processing request;
determining whether a first acknowledgement has been received from the wireless device in response to the first acknowledgement request within a first predetermined time period;
in response to a determination that the first acknowledgement has not been received within the first predetermined time period:
adding a second SMS message to the transmission queue at a queue position earlier than the first SMS message, the second SMS message including a second acknowledgement request and a content non-processing request, and transmitting the second SMS message to the wireless device; determining whether a second acknowledgement has been received from the wireless device in response to the second acknowledgement request within a second predetermined time period; and in response to a determination that the second acknowledgement has been received within the second predetermined time period, removing the second SMS message from the transmission queue and retransmitting the first SMS message to the wireless device.

2. The method according to claim 1, further comprising:
in response to a determination that the second acknowledgement has not been received within the second predetermined time period, retransmitting the second SMS message to the wireless device.

3. The method according to claim 2, further comprising:
in response to a determination that the second acknowledgement has been received after the retransmitting the second SMS message to the wireless device, removing the second SMS message from the transmission queue and retransmitting the first SMS message to the wireless device.

4. The method according to claim 3, further comprising:
in response to a determination that the first acknowledgement has been received after the retransmitting the first SMS message to the wireless device, removing the first SMS message from the transmission queue.

5. The method according to claim 1, further comprising:
in response to a determination that the second acknowledgement has not been received within the second predetermined time period, repeatedly retransmitting the second SMS message to the wireless device at a predetermined interval until the determination that the second acknowledgement has been received is made.

6. The method according to claim 1, wherein the second SMS message is a Short Message Type 0 message.

7. The method according to claim 1, wherein the network is configured to communicate according to an IP Multimedia Subsystem (IMS) protocol.

8. A system for managing messages in a network, comprising:
a processing node; and
an electronic processor coupled to the processing node, the electronic processor being configured to perform operations comprising:
transmitting a first short messaging service (SMS) message to a wireless device, the first SMS message including a first acknowledgement request and a content processing request,
determining whether a first acknowledgement has been received from the wireless device in response to the first acknowledgement request within a first predetermined time period,
in response to a determination that the first acknowledgement has not been received within the first predetermined time period, transmitting a second SMS message to the wireless device, the second SMS message including a second acknowledgement request and a content non-processing request, and
determining whether a second acknowledgement has been received from the wireless device in response to the second acknowledgement request within a second predetermined time period, and in response to a determination that the second acknowledgement has been received within the second predetermined time period, retransmitting the first SMS message to the wireless device.

9. The system according to claim 8, wherein the electronic processor is further configured to perform operations comprising:
in response to a determination that the second acknowledgement has not been received within the second predetermined time period, retransmitting the second SMS message to the wireless device.

10. The system according to claim 9, wherein the electronic processor is further configured to perform operations comprising:
in response to a determination that the second acknowledgement has been received after the retransmitting the second SMS message to the wireless device, retransmitting the first SMS message to the wireless device.

11. The system according to claim 10, wherein the electronic processor is further configured to perform operations comprising:
in response to a determination that the first acknowledgement has been received after the retransmitting the first SMS message to the wireless device, determining that the first SMS message has been received by the wireless device.

12. The system according to claim 8, wherein the electronic processor is further configured to perform operations comprising:
in response to a determination that the second acknowledgement has not been received within the second predetermined time period, repeatedly retransmitting the second SMS message to the wireless device at a predetermined interval until the determination that the second acknowledgement has been received is made.

13. The system according to claim 8, wherein the second SMS message is a Short Message Type 0 message.

14. The system according to claim 8, wherein the network is configured to communicate according to an IP Multimedia Subsystem (IMS) protocol.

15. The system according to claim 8, wherein the processing node is a Short Message Service Center (SMSC).

16. A non-transitory computer-readable medium storing instructions that, when executed by a processor, cause the processor to perform operations comprising:
adding a first short messaging service (SMS) message to a transmission queue;
transmitting the first SMS message to a wireless device, the first SMS message including a first acknowledgement request and a content processing request;
determining whether a first acknowledgement has been received from the wireless device in response to the first acknowledgement request within a first predetermined time period;
in response to a determination that the first acknowledgement has not been received within the first predetermined time period:
adding a second SMS message to the transmission queue at a queue position earlier than the first SMS message, the second SMS message including a second acknowledgement request and a content non-processing request, and
transmitting the second SMS message to the wireless device;
determining whether a second acknowledgement has been received from the wireless device in response to the second acknowledgement request within a second predetermined time period; and in response to a determination that the second acknowledgement has been received within the second predetermined time period, removing the second SMS message from the transmission queue and retransmitting the first SMS message to the wireless device.

17. The non-transitory computer-readable medium according to claim 16, the operations further comprising:

in response to a determination that the second acknowledgement has not been received within the second predetermined time period, repeatedly retransmitting the second SMS message to the wireless device at a predetermined interval until the determination that the second acknowledgement has been received is made.

18. The non-transitory computer-readable medium according to claim 17, the operations further comprising:

in response to a determination that the second acknowledgement has been made after retransmitting the second SMS message to the wireless device, retransmitting the first SMS message to the wireless device.

19. The non-transitory computer-readable medium according to claim 16, wherein the second SMS message is a Short Message Type 0 message.

20. The non-transitory computer-readable medium according to claim 16, wherein the first predetermined time period is predetermined by a network operator.

* * * * *